US009637406B2

(12) United States Patent
Dewet-Smith et al.

(10) Patent No.: US 9,637,406 B2
(45) Date of Patent: May 2, 2017

(54) APPARATUS FOR MELTING AND REFINING SILICA-BASED GLASS

(71) Applicant: Owens-Brockway Glass Container Inc., Perrysburg, OH (US)

(72) Inventors: Dawid Dewet-Smith, Goose Creek, SC (US); D. Wayne Leidy, Philadelphia, PA (US); Carl L. Fayerweather, Maumee, OH (US); Daniel R. Swiler, Maumee, OH (US); Terence J. Clark, Sanford, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 152 days.

(21) Appl. No.: 13/832,829

(22) Filed: Mar. 15, 2013

(65) Prior Publication Data
US 2014/0260433 A1  Sep. 18, 2014

(51) Int. Cl.
*C03B 5/225* (2006.01)
*C03B 5/173* (2006.01)
*C03B 5/187* (2006.01)

(52) U.S. Cl.
CPC ............ *C03B 5/2252* (2013.01); *C03B 5/173* (2013.01); *C03B 5/187* (2013.01)

(58) Field of Classification Search
CPC ............................... C03B 5/225; C03B 5/2252
See application file for complete search history.

(56) References Cited

U.S. PATENT DOCUMENTS

| 1,598,308 A | 8/1926 | Pike |
| 3,519,412 A * | 7/1970 | Olink ............................. 65/337 |
| 4,004,902 A | 1/1977 | Pieper |

(Continued)

FOREIGN PATENT DOCUMENTS

| EP | 0556576 A1 | 8/1993 |
| WO | 2011106605 | 9/2011 |
| WO | 2013067129 | 5/2013 |

OTHER PUBLICATIONS

PCT Search Report and Written Opinion, Int Serial No. PCT/US2014/020629, Int Filing Date: Mar. 5, 2014, Applicant: Owens-Brockway Glass Container Inc., Mail Date: Jun. 12, 2014.

*Primary Examiner* — Lisa Herring (57) ABSTRACT

An apparatus for melting and refining a silica-based glass composition includes a vertical first reaction chamber having an input adjacent to a lower end for receiving glass-forming components. The glass-forming components are heated to elevated temperature during upward flow through the vertical first reaction chamber to form a glass precursor melt adjacent to an upper end of the vertical first reaction chamber. A vertical second reaction chamber has an input adjacent to an upper end and an output adjacent to a lower end for delivering glass melt. A cross passage connects the upper end of the vertical first reaction chamber to the upper end of the vertical second reaction chamber such that the precursor melt flows from the vertical first reaction chamber through the cross passage and then through the vertical second reaction chamber to homogenize the precursor melt. Vacuum preferably is applied to the cross passage both to assist upward flow through the vertical first reaction chamber, and to assist refining of the precursor melt during such upward flow and during flow through the cross passage.

30 Claims, 5 Drawing Sheets

(56) References Cited

U.S. PATENT DOCUMENTS

| | | | |
|---|---|---|---|
| 4,246,432 A * | 1/1981 | Rinkes | C03B 5/03 373/30 |
| 4,325,724 A | 4/1982 | Froberg | |
| 5,316,563 A * | 5/1994 | Ishimura et al. | 65/32.5 |
| 5,367,532 A * | 11/1994 | Boen | C03B 5/005 373/142 |
| 5,849,058 A * | 12/1998 | Takeshita et al. | 65/134.2 |
| 6,119,484 A | 9/2000 | Takei et al. | |
| 6,318,126 B1 * | 11/2001 | Takei et al. | 65/134.2 |
| 6,332,339 B1 | 12/2001 | Kawaguchi et al. | |
| 6,536,238 B2 | 3/2003 | Kawaguchi et al. | |
| 6,948,338 B2 | 9/2005 | Sakai et al. | |
| 7,650,764 B2 | 1/2010 | Sakai et al. | |
| 8,910,497 B2 | 12/2014 | Leidy et al. | |
| 2002/0062664 A1 * | 5/2002 | Schmitt et al. | 65/134.2 |
| 2003/0015000 A1 * | 1/2003 | Hayes et al. | 65/134.2 |
| 2004/0224833 A1 | 11/2004 | Jeanvoine et al. | |
| 2006/0268663 A1 * | 11/2006 | Bitton | G01S 3/8083 367/127 |
| 2008/0187686 A1 | 8/2008 | Rodriguez Cuartas et al. | |
| 2009/0217708 A1 * | 9/2009 | DeAngelis | C03B 5/16 65/134.2 |
| 2009/0249834 A1 * | 10/2009 | Rue et al. | 65/134.9 |
| 2009/0277226 A1 * | 11/2009 | Santangelo et al. | 65/181 |
| 2011/0016922 A1 | 1/2011 | Kitamura et al. | |
| 2012/0055200 A1 * | 3/2012 | Hirayama et al. | 65/469 |
| 2012/0167633 A1 * | 7/2012 | Hirayama | C03B 5/182 65/379 |

* cited by examiner

APPARATUS FOR MELTING AND REFINING SILICA-BASED GLASS

The present disclosure relates to an apparatus for melting and refining silica-based glass, and particularly to such an apparatus that employs a sodium-calcium-silicate glass as an intermediate precursor product.

BACKGROUND AND SUMMARY OF THE DISCLOSURE

Silica-based glass, such as soda-lime glass, is prevalent in the manufacture of glass containers and other products. Formation of a raw glass melt typically involves mixing various glass-forming components at elevated temperature. The glass typically has a residence time in a furnace on the order of twenty-four hours to dissolve the solids and refine the glass by driving off gases. The gases must be driven off ultimately to produce a solidified glass product without entrained bubbles. (The process of removing bubbles and bubble-forming gasses in molten glass is called "refining.") In addition to being undesirably slow, this in-furnace process involves a large amount of space and high-energy input.

The general object of the present disclosure is to provide an apparatus for making silica-based glass, which is compact and modular. Another object of the disclosure is to provide an apparatus for making a silica-based glass melt, which can readily be scaled up or down as needed to provide a desired glass output.

The present disclosure embodies a number of aspects that can be implemented separately from or in combination with each other.

Apparatus for melting and refining a silica-based glass composition, in accordance with one aspect of the present disclosure, includes a first melting vessel for receiving and melting silica-based glass forming components, a first vertical chamber having an inlet adjacent to a lower and operatively coupled to said first melting vessel to receive melted glass-forming components from said first melting vessel, a second vertical chamber spaced from and separate from the first vertical chamber, and a cross passage connecting an upper end of the first vertical chamber to an upper end of the second vertical chamber. Glass melt from the first melting vessel flows upward through the first vertical chamber, through the cross passage and then downward through the second vertical chamber to refine and homogenize the glass melt from the first melting vessel. A vacuum preferably is applied to the cross passage to assist upward flow of the glass melt through the first vertical chamber.

The cross passage preferably receives cullet to mix with the glass melt prior to and during flow through the second vertical chamber. The cross passage can have an input for receiving additional materials such as silica and minor ingredients or additives so that such additional materials are mixed with the glass melt during flow through the cross passage and the second vertical chamber. As an alternative, a second melting vessel can be operatively disposed between the first melting vessel and the first vertical chamber for adding additional materials such as silica and minor additives to the glass melt prior to passage through the first vertical chamber. In such modification, vacuum can be applied to the first and/or second melting vessel at least partially to refine the glass melt prior to passage through the first vertical chamber.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Co-owned U.S. application Ser. No. 13/288,681, now U.S. Pat. No. 8,910,497, discloses a process for melting and refining silica-based glass, which can be implemented employing an apparatus of the present disclosure. In general, the co-pending application discloses a process for making a glass precursor melt, which includes mixing at least one glass network former with at least one glass network modifier, and refining the glass precursor melt by performing at least part of the mixing step at elevated temperature under reduced pressure to promote release of gases produced by the precursor melt. Additional glass network formers but, preferably, no additional glass network modifiers are mixed with the precursor melt to form a glass product melt. Cullet and/or minor additives such as colorants can be added. The disclosure of such co-pending application is incorporated herein by reference.

A process for making a silica-based glass melt in accordance with one exemplary embodiment of such co-pending application employs glass network formers and glass network modifiers to form a glass precursor melt having low viscosity from which bubbles readily migrate. The amounts of the glass network formers and/or the glass network modifiers obtain the desired bubble-releasing low viscosity at a desired temperature, preferably in the range of 900° C. to 1700° C. Glass network modifiers are added to the precursor melt to decrease the viscosity and the refining time to achieve full liberation of bubbles from the precursor melt. A greater percentage of glass network formers would necessitate a higher melt temperature to obtain the desired low viscosity for refining. Thus, a balance is obtained between glass network formers and glass network modifiers to optimize the glass precursor melt with respect to low viscosity. After the glass precursor melt has been refined, additional glass network formers can be added to achieve the desired final glass melt composition. These additional glass network formers can be added as sulfides, acids and/or oxides. Cullet and/or minor ingredients such as colorants can also be added.

The term "glass network former" is employed in its usual sense in the art as referring to oxides and non-oxides capable of forming and being incorporated into a random glass network or lattice. Silica ($SiO_2$), alumina ($Al_2O_3$) and boric oxide ($B_2O_3$) are three examples of glass network formers. The term "glass network modifier" likewise is employed in its usual sense to refer to oxides within the glass that do not participate in forming the glass network structure and force the glass network to form around the modifier. Examples include the oxides of the alkali metals (sodium, lithium and potassium) and oxides of the alkaline earth metals (calcium, magnesium and barium).

Figure 1:
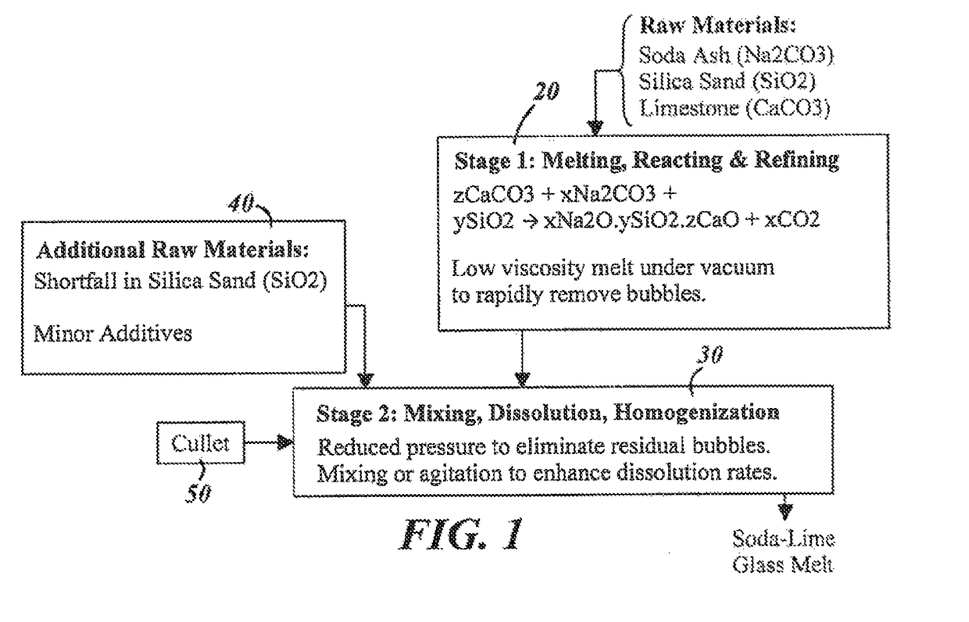
FIG. 1 is a block diagram of an exemplary process for reacting, melting and refining silica-based glass in an apparatus of the present disclosure.
Figure 2:
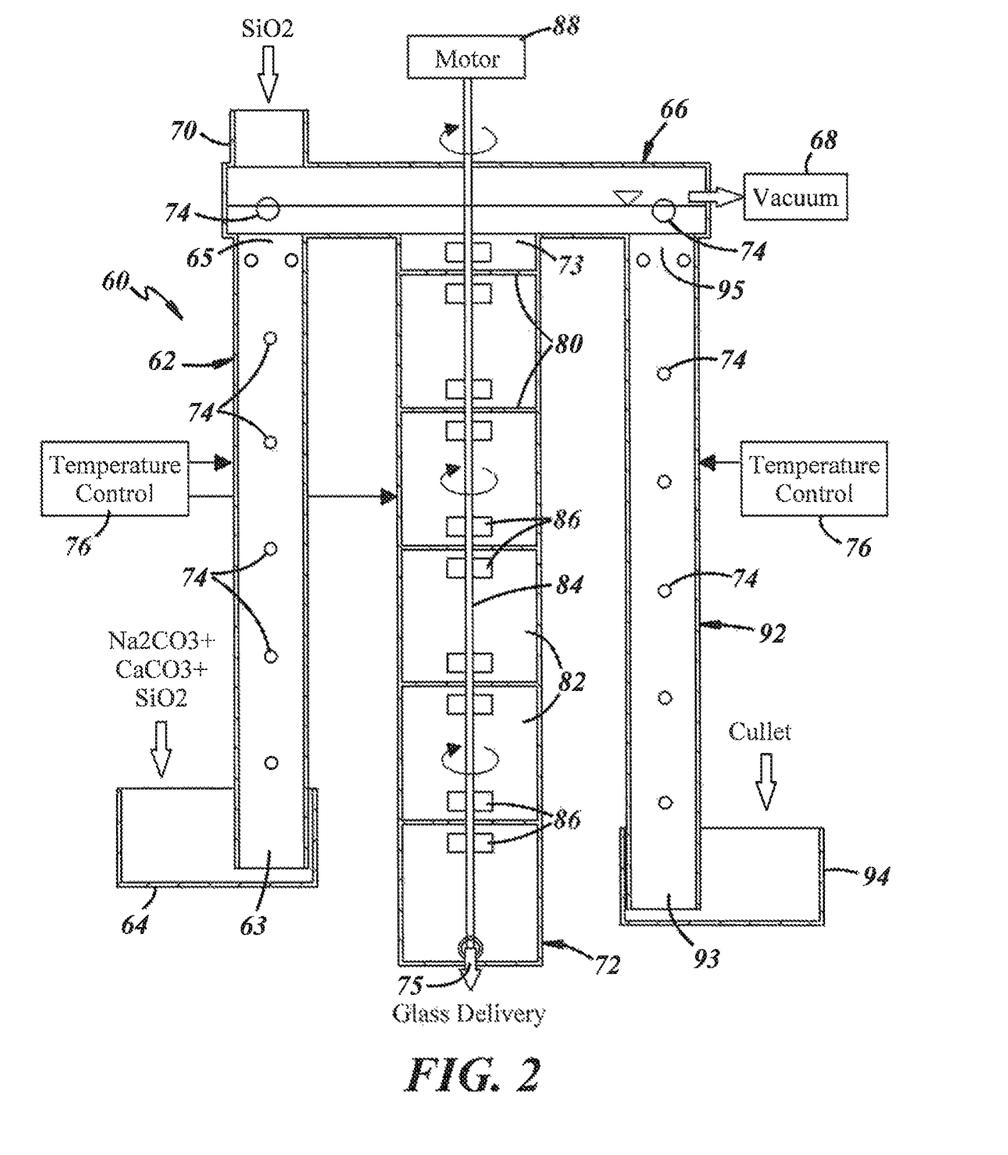
FIG. 2 is a schematic diagram of an apparatus for reacting, melting and refining a silica-based glass composition in accordance with an exemplary embodiment of the present disclosure.

FIG. 1 illustrates a process for making silica-based glass in accordance with one exemplary embodiment in such co-pending application, which process is implemented in the exemplary apparatus of FIG. 2 of the present application. A first stage 20 of the process in FIG. 1 involves melting, reacting and refining input materials, preferably under vacuum (reduced pressure) and production of a low-viscosity sodium-calcium-silicate solution in liquid phase by melting, reacting and refining substantially all of the desired network modifiers and silica. This reaction produces an at least partially refined silicate precursor glass melt in liquid phase. The silicate solution precursor melt or intermediate product of first stage 20 is fed to a second stage 30, which involves mixing, dissolution and homogenization of the glass precursor melt with additional raw materials 40 including any shortfall of glass network formers such as silica and/or minor additives such as colorants. Stage 30 preferably also receives cullet (recycled glass) 50, and produces a soda-lime glass melt.

The silicate solution precursor melt or intermediate product of the first stage 20 has a relatively low viscosity to promote release of gaseous reaction products. The term "low-viscosity" in accordance with the present disclosure means having a viscosity of not more than 3 Pa·s. Target viscosity typically would be in the range of 1 to 3 Pa·s, with a value of 2 Pa·s being an optimum target. The silicate solution precursor melt or intermediate product of this first stage 20 typically has a silica molar content on the order of 40-60%. Additional silica is added at the second stage 30 to reach the desired final glass composition with a silica content typically on the order of 65-80% by weight. The second stage 30 can include stirring and/or other mixing to promote dissolution and homogenization of the final silica-based glass melt.

The first stage 20 of the process may involve melting, reacting and refining substantially all of the gas releasing glass network modifiers required for the desired final melt composition with appropriate chemical ratio of glass network formers to produce a glass precursor melt having low viscosity from which bubbles readily migrate. In such case, in the second stage 30 of the process, the glass precursor melt may be mixed with non-gas releasing glass network modifiers and/or non-gas releasing glass network formers to achieve the desired final glass melt composition. Cullet and other additives such as colorants may be added in the second stage 30, which may include stirring.

The term "gas releasing" is used to describe chemical forms of an element that evolve gases upon decomposition, including the carbonate, bicarbonate, sulfate, hydrate, hydroxide, nitrate, chloride or acid form(s) of a given element. The term "non-gas releasing" is used to describe chemical forms of an element that do not evolve gases upon decomposition, including the oxide, sulfide and elemental forms of a given element. Gas releasing glass network modifier(s) most preferably is (are) a carbonate, bicarbonate, sulfate, hydrate, hydroxide, nitrate, chloride or acid form(s) of the noted alkali metals and alkaline metals.

The first stage 20 of the process preferably is carried out at a temperature in the range of about 900° C. to about 1700° C. The second stage 30 of the process preferably is carried out at a temperature greater than about 900° C. Most preferably, the first stage 20 of the process is carried out at a temperature of about 1250° C. for not more than 2 hours. The glass network modifiers within the precursor melt of the first stage 20 preferably have an alkali metal to alkaline metal molar ratio of 1:3 to 3:1. The glass precursor melt preferably has a glass network modifier to glass network former molar ratio of 2:1.5 to 1:2. The sodium-calcium-silicate solution glass precursor melt of the first stage 20 preferably has a sodium:calcium:silicon molar ratio of about 1:1:1.5 to 1:1:4.

In summary, the glass precursor melt composition produced in the first stage 20 is designed to minimize the viscosity at reasonable processing temperatures to facilitate refining. Therefore, all glass network modifiers that are in a chemical form that releases gases upon decomposition are generally added in the first stage 20. And, all glass network formers that are added in chemical form that releases gases upon decomposition are generally added in the first stage 20. Additionally, any glass network former or glass network modifier that is added in a chemical form that does not release gases upon decomposition may be added in the first stage 20 at appropriate chemical ratios to minimize the viscosity of the glass precursor melt. All materials added in the second stage 30 are generally in a chemical form that does not release a significant quantity of gases upon decomposition.

FIG. 2 illustrates an apparatus 60 for implementing the process of FIG. 1 (or more generally the process of the above-referenced co-pending application). Apparatus 60 includes a vertical first reaction chamber 62 having an input adjacent to a lower end 63 for receiving glass-forming components, such as from an induction-heated crucible 64. Vertical first reaction chamber 62 has an upper end 65 coupled to a cross passage 66 having an interior coupled to a vacuum pump or the like 68 for reducing pressure in cross passage 66. Cross passage 66 also has an input 70 for receiving additional raw materials such as silica and minor additives in stage 40 of FIG. 1. A vertical second reaction chamber 72 has an input 73 adjacent to an upper end coupled to cross passage 66 and an output 75 adjacent a lower end for delivering glass melt. At least vertical first reaction chamber 62, and preferably also cross passage 66, has heating elements 74 coupled to a suitable temperature control 76 for controlling the temperature within the reaction chamber and cross passage.

Application of vacuum to cross passage 66, by means of vacuum pump 68 for example, not only assists upward flow of glass-forming materials through vertical first reaction chamber 62, but also assists refining (removal of air bubbles) of the precursor melt in cross passage 66 during such upward flow and during flow through the cross passage to vertical second reaction chamber 72. The low viscosity of the glass material flowing through vertical first reaction chamber 62 not only assists such upward flow under vacuum but also promotes release of gas bubbles.

Vertical second reaction chamber 72 preferably includes at least one cross wall 80, and preferably a plurality of cross walls 80, effectively dividing the vertical second reaction chamber into a plurality of mixing cells 82. Cross walls 80 help prevent direct passage of unmelted solids through the vertical second reaction chamber. The upper cells 82 promote final dissolution of any unmelted solids in the glass stream flowing through reaction chamber 72, while the lower cells promote cooling of the glass stream to a desired output glass delivery temperature. A shaft 84 preferably extends through at least some of the cells 82 and paddles 86 preferably are coupled to shaft 84 in at least some of the cells. Shaft 84 is coupled to a motor 88 or the like for rotating the shaft and the paddles further to promote mixing and homogenization of the glass melt during downward flow through vertical second reaction chamber 72 toward glass delivery output 75. One or more cells 82 can include heaters 74 coupled to control 76, and the temperatures within the various cells 82 of vertical second reaction chamber 72 preferably are controlled so that glass is delivered at output 75 at a temperature suitable for use immediately to form glass gobs in a glassware-forming machine, for example.

In the preferred embodiment illustrated in FIG. 2, a vertical third reaction chamber 92 has an input 93 adjacent to a lower end for receiving cullet, such as in an induction-heated crucible 94. Heaters 74 are coupled to a temperature control 76 for controlling the temperature of cullet glass flowing upward through vertical third reaction chamber 92. The upper end 95 of vertical third reaction chamber 92 is connected to cross passage 66 so that cullet flowing into cross passage 66 is mixed with the precursor glass melt prior to and during downward flow through vertical second reaction chamber 72. Reduced pressure ("vacuum") in cross passage 66 assists upward flow of cullet and refining (as needed) of the cullet during such upward flow. It is estimated that the process of FIG. 1 can be completed in the apparatus of FIG. 2 in six hours (as compared with twenty-four hours typical in current furnaces). This would involve about two hours of upward flow in chamber 62 and four hours of downward flow in chamber 72.

Figure 3:
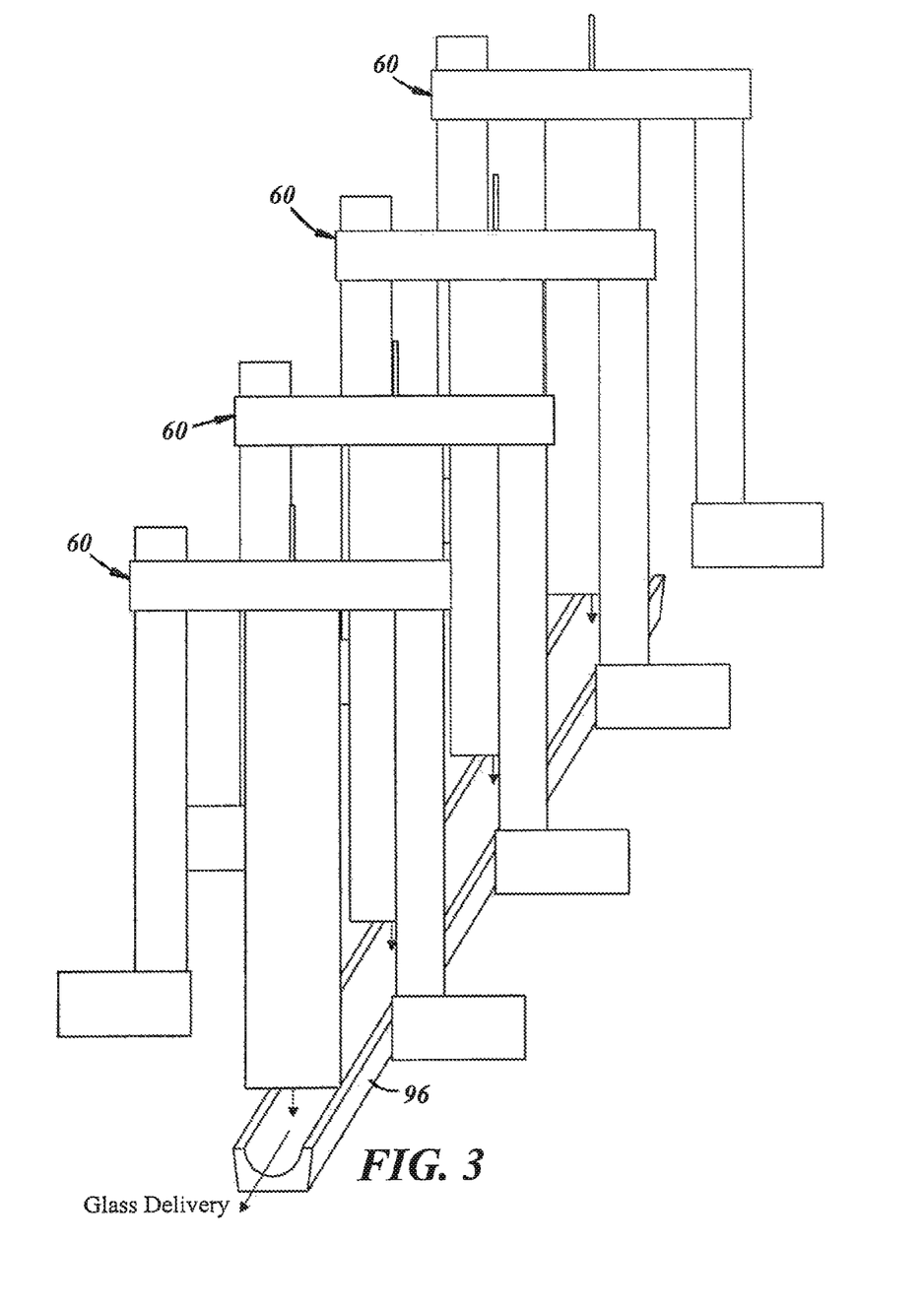
FIG. 3 is a schematic diagram that illustrates a number of the modular apparatus in FIG. 2 disposed in parallel for selectively increasing glass output.

FIG. 3 illustrates parallel connection of several apparatus 60, which can be selectively enabled or disenabled to control the volume of glass flow through a glass output channel 96 or the like.

Figure 4:
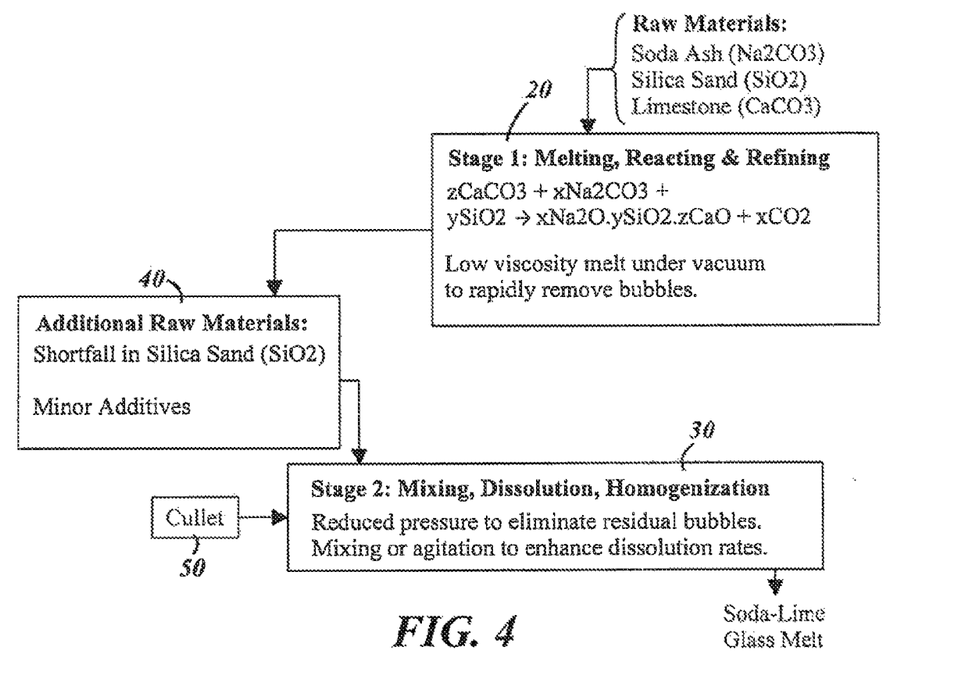
FIG. 4 is a block diagram of a second exemplary process for reacting, melting and refining silica-based glass in an apparatus of the present disclosure.

FIG. 4 illustrates a process as a modification to the process of FIG. 1 in accordance with a second exemplary embodiment of the present disclosure. The precursor melt output of first stage 20 is fed as an input to stage 40 in this embodiment, in which any shortfall in silica is added to the precursor output of stage 20, along with any desired minor additives such as colorants. The output of stage 40 is then fed as an input to mixing, dissolution and homogenization stage 30, from which a soda-lime glass melt emerges. Cullet, if desired, is fed as an input to stage 30.

Figure 5:
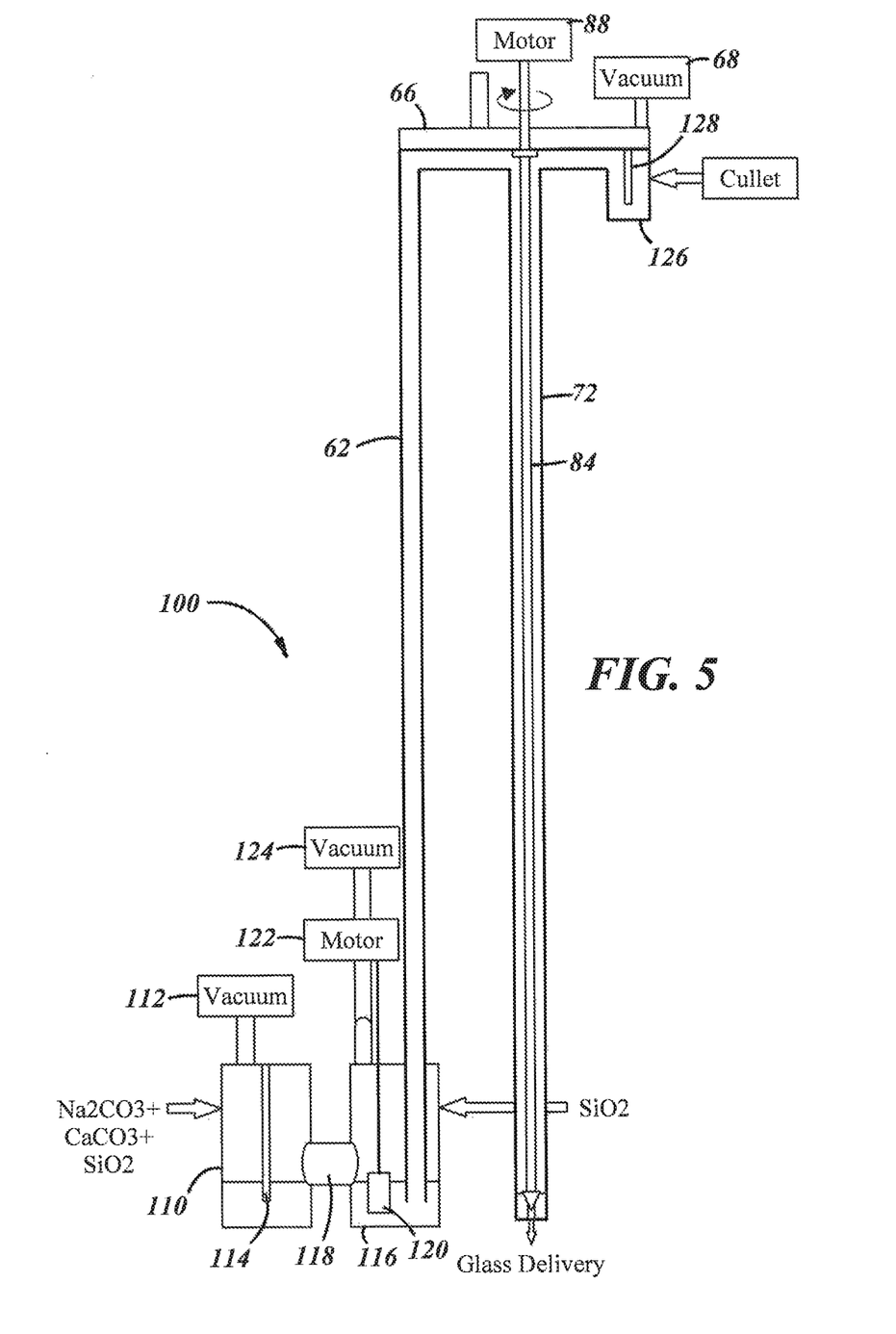
FIG. 5 is a schematic diagram of an apparatus for reacting, melting and refining a silica-based glass composition in accordance with the process of FIG. 4.

FIG. 5 illustrates an apparatus 100 for implementing the process of FIG. 4 in accordance with an exemplary embodiment of the present disclosure. A vessel 110 such as an induction-heated crucible receives the calcium carbonate, sodium carbonate and silica inputs of stage 20 in FIG. 4 and forms a precursor melt. Vacuum 112 preferably is applied to vessel 110 at least partially to refine the precursor glass melt. By way of example only, the temperature within vessel 110 can be in the range of 1280° C. to 1300° C. A dam 114 can be employed to control glass flow and prevent the migration of un-melted glass forming materials into the second melting vessel 116.

The precursor glass melt output of vessel 110 is fed through a passage 118 to a second melting vessel 116. Process stage 40 in FIG. 4 takes place in vessel 116, in which the shortfall of silica is added to the precursor glass from vessel 110, along with any minor additives such as colorants. A paddle 120 or the like is coupled to a motor 122 for stirring the blend in vessel 116 to promote mixing and release of gas. Vessel 116 is coupled to a vacuum source 124 for assisting in the removal of any gases released within vessel 116.

The molten glass from vessel 116 is drawn through first vertical chamber 62 to cross passage 66 and thence to second vertical chamber 72. In this embodiment, cullet preferably is added to a reaction vessel 126 coupled to cross passage 66. A dam 128 prevents migration of un-melted cullet to chamber 66. Thus, precursor melt from vessel 110, silica and any minor additives added in vessel 116 and cullet optionally added in vessel 126 flow together through second vertical chamber 72. As in the embodiment of FIG. 2, motor 88 is coupled by a shaft 84 to various paddles or the like to mix and blend the glass constituents flowing though chamber 72 prior to emergence as delivered glass.

There thus has been disclosed an apparatus for making silica-based glass that fully satisfies all of the objects and aims previously set forth. The disclosure has been presented in conjunction with presently preferred embodiments, and alternatives and modifications have been discussed. Other alternatives and modifications readily will suggest themselves to persons of ordinary skill in the art in view of the foregoing description. The disclosure is intended to embrace all such modifications and variations as fall within the spirit and broad scope of the appended claims.

The invention claimed is:

1. An apparatus for making glass including:
   a first vertical chamber having an inlet adjacent a lower end thereof and an outlet adjacent an upper end thereof through which molten glass or a molten glass precursor is discharged;
   a first melting vessel in the form of an induction heated crucible in which solid glass forming components are received, melted, and reacted with one another to produce molten glass or a molten glass precursor, said first melting vessel including a dam and being operatively coupled to said inlet of said first vertical chamber such that the molten glass or the molten glass precursor produced in said first melting vessel is introduced into said first vertical chamber via said inlet of said first vertical chamber, wherein said dam prevents migration of un-melted glass forming components from said first melting vessel into said first vertical chamber;
   a second vertical chamber spaced from and separate from said first vertical chamber, said second vertical chamber having an inlet at an upper end thereof through which molten glass or a molten glass precursor is received from said first vertical chamber and an outlet at a lower end thereof through which molten glass is discharged; and
   a cross passage connecting said upper ends of said first and second vertical chambers and through which molten glass or a molten glass precursor flows from said first vertical chamber into said second vertical chamber,
   wherein said cross passage includes a first inlet in which at least one solid glass-forming material is received and introduced into the molten glass or the molten glass precursor flowing through said cross passage at a location above a free surface of the molten glass or the molten glass precursor flowing therethrough, and
   wherein said cross passage includes a second inlet in which molten glass or a molten glass precursor is received and introduced into the molten glass or the molten glass precursor flowing through said cross passage at a location below a free surface of the molten glass or the molten glass precursor flowing therethrough.

2. The apparatus set forth in claim 1 including a vacuum coupled to said cross passage that assists upward flow of molten glass or a molten glass precursor through said first vertical chamber and removal of gas bubbles therefrom.

3. The apparatus set forth in claim 1 including a rotatable shaft with paddles extending through at least a portion of said second vertical chamber that mixes the at least one solid glass-forming material into the molten glass or the molten glass precursor flowing downward through said second vertical chamber.

4. The apparatus set forth in claim 1 wherein said second vertical chamber includes at least one cross wall that divides said second vertical chamber into a plurality of cells and prevents direct passage of the at least one solid glass-forming material through said second vertical chamber.

5. The apparatus set forth in claim 1 including a second melting vessel disposed between and operatively coupled to said first melting vessel and to said inlet of said first vertical chamber, wherein at least one solid glass-forming material is received within said second melting vessel and introduced into the molten glass or the molten glass precursor flowing from said first melting vessel into said first vertical chamber.

6. The apparatus set forth in claim 5 wherein said second melting vessel includes a paddle coupled to a motor that mixes the at least one solid glass-forming material into the molten glass flowing from said first melting vessel into said first vertical chamber.

7. The apparatus set forth in claim 6 including a vacuum coupled to an interior of said second melting vessel that assists in removal of gas bubbles from the molten glass or the molten glass precursor flowing from said first melting vessel into said first vertical chamber.

8. A modular apparatus for making glass, including at least two apparatuses as set forth in claim 1, said apparatuses being arranged in parallel and being selectively connectible and disconnectable from one another.

9. The apparatus set forth in claim 1 wherein said cross passage includes a top and a bottom, and said first inlet in said cross passage is located in said top of said cross passage and said second inlet in said cross passage is located in said bottom of said cross passage.

10. The apparatus set forth in claim 1 wherein said cross passage includes a first end, a second end opposite said first end, and an outlet located at an intermediate location between said first and second ends, said first inlet in said cross passage being located at said first end of said cross passage and said second inlet in said cross passage being located at said second end of said cross passage, and wherein molten glass is discharged from said cross passage via said outlet located between said first and second ends of said cross passage.

11. An apparatus for making glass including:
a first vertical chamber having an inlet adjacent a lower end thereof and an outlet adjacent an upper end thereof through which molten glass or a molten glass precursor is discharged;
a second vertical chamber spaced from and separate from said first vertical chamber, said second vertical chamber having an inlet at an upper end thereof through which molten glass or a molten glass precursor is received from said first vertical chamber and an outlet at a lower end thereof through which molten glass is discharged;
a cullet melting vessel spaced from and separate from said first and second vertical chambers that receives and melts solid cullet to produce molten glass; and
a cross passage through which molten glass or a molten glass precursor flows from said first vertical chamber into said second vertical chamber, wherein said cross passage connects said upper ends of said first and second vertical chambers to each other and to an outlet of said first melting vessel,
wherein said cross passage includes a first inlet in which at least one solid glass-forming material is received and introduced into the molten glass or the molten glass precursor flowing through said cross passage at a location above a free surface of the molten glass or the molten glass precursor flowing therethrough,
wherein said cross passage includes a second inlet in which molten glass or a molten glass precursor is received and introduced into the molten glass or the molten glass precursor flowing through said cross passage at a location below a free surface of the molten glass or the molten glass precursor flowing therethrough, and
wherein molten glass produced in said cullet melting vessel is received within said cross passage via said second inlet in said cross passage and introduced into said second vertical chamber via said inlet in said second vertical chamber.

12. The apparatus set forth in claim 11 wherein said cullet melting vessel includes a dam that prevents migration of un-melted cullet from said cullet melting vessel into said cross passage.

13. An apparatus for making glass including:
a first melting vessel in which solid glass forming components are received, melted, and reacted with one another to produce molten glass or a molten glass precursor;
a first vertical chamber having an inlet adjacent a lower end thereof through which the molten glass or the molten glass precursor is received from said first melting vessel and an outlet adjacent an upper end thereof through which the molten glass or the molten glass precursor is discharged;
a second vertical chamber spaced from and separate from said first vertical chamber;
a cullet melting vessel spaced from and separate from said first and second vertical chambers that receives and melts solid cullet to produce molten glass; and
a cross passage connecting upper ends of said first and second vertical chambers to each other and to said cullet melting vessel and through which molten glass or a molten glass precursor flows from said first vertical chamber and said cullet melting vessel into said second vertical chamber;
wherein said second vertical chamber has an inlet at its upper end through which molten glass or a molten glass precursor is received from said first vertical chamber and from said cullet melting vessel and an outlet at a lower end thereof through which molten glass is discharged, and
wherein said cullet melting vessel has an outlet located below a free surface of the molten glass or the molten glass precursor flowing through said cross passage.

14. The apparatus set forth in claim 13 wherein said cullet melting vessel includes a dam that prevents migration of un-melted cullet from said cullet melting vessel into said cross passage.

15. The apparatus set forth in claim 13 including a vacuum coupled to said cross passage to assist upward flow of molten glass or a molten glass precursor through said first vertical chamber and removal of gas bubbles therefrom.

16. The apparatus set forth in claim 13 wherein said cross passage includes a first inlet through which at least one solid glass-forming material is received and introduced into molten glass or a molten glass precursor flowing from said first vertical chamber and from said cullet melting vessel into said second vertical chamber.

17. The apparatus set forth in claim 16 including a rotatable shaft with paddles extending through at least a portion of said second vertical chamber that mixes the at least one solid glass- forming material into the molten glass or the molten glass precursor flowing downward through said second vertical chamber.

18. The apparatus set forth in claim 16 wherein said second vertical chamber includes at least one cross wall that divides said second vertical chamber into a plurality of cells and prevents direct passage of the at least one solid glass-forming material through said second vertical chamber.

19. The apparatus set forth in claim 13 including a third vertical chamber spaced from and separate from said first vertical chamber and said second vertical chamber and disposed between said cross passage and said cullet melting vessel, said third vertical chamber being operatively coupled to said outlet of said cullet melting vessel and to a second inlet of said cross passage, wherein said second inlet of said cross passage is located below a free surface of the molten glass or the molten glass precursor flowing through said cross passage.

20. The apparatus set forth in claim 13 including a second melting vessel disposed between said first melting vessel and said inlet of said first vertical chamber, said second melting vessel being operatively coupled to said first melting vessel and said inlet of said first vertical chamber, wherein at least one glass-forming material is received within said second melting vessel and introduced into molten glass or a molten glass precursor flowing from said first melting vessel into said first vertical chamber.

21. A modular apparatus for making glass, including at least two apparatuses as set forth in claim 13, said apparatuses being arranged in parallel and being selectively connectible and disconnectable from one another.

22. The apparatus set forth in claim 13 wherein said cross passage includes a first end, a second end opposite said first end, and an outlet located at an intermediate location between said first and second ends, said outlet of said first vertical chamber being operatively coupled to said first end of said cross passage, said cullet melting vessel being operatively coupled to said second end of said cross passage, and said inlet of said second vertical chamber being operatively coupled to said outlet of said cross passage.

23. An apparatus for making glass including:
a first vertical chamber having an inlet adjacent a lower end thereof through which molten glass or a molten glass precursor is received;
a second vertical chamber spaced from and separate from said first vertical chamber;
a third vertical chamber spaced from and separate from said first vertical chamber and said second vertical chamber and having an inlet adjacent a lower end thereof through which molten glass or a molten glass precursor is received;
a cross passage connecting upper ends of said first, second, and third vertical chambers, said cross passage having a first inlet through which at least one solid glass-forming material is received and introduced into the molten glass or the molten glass precursor flowing through said cross passage; and
a first melting vessel in the form of an induction heated crucible that receives and melts at least one solid glass-forming material to produce molten glass or a molten glass precursor, said first melting vessel including a dam and being operatively coupled to said inlet of said third vertical chamber such that the molten glass or the molten glass precursor produced in said first melting vessel flows upward through said third vertical chamber and into said cross passage, wherein said dam prevents migration of un-melted glass forming components from said first melting vessel into said first vertical chamber,
wherein said second vertical chamber has an inlet at its upper end through which molten glass or a molten glass precursor is received from said first and third vertical chambers and an outlet at a lower end thereof through which molten glass is discharged, and
wherein said third vertical chamber has an outlet at its upper end through which molten glass or a molten glass precursor is discharged, said outlet of said third vertical chamber being located below a free surface of the molten glass or the molten glass precursor flowing through said cross passage.

24. The apparatus set forth in claim 23 including a vacuum coupled to said cross passage to assist upward flow of molten glass or a molten glass precursor through said first and third vertical chambers.

25. The apparatus set forth in claim 23 including a rotatable shaft with paddles extending through at least a portion of said second vertical chamber that mixes the at least one solid glass-forming material with the molten glass or the molten glass precursor flowing downward through said second vertical chamber.

26. The apparatus set forth in claim 23 wherein said second vertical chamber includes at least one cross wall that divides said second vertical chamber into a plurality of cells and prevents direct passage of the at least one solid glass-forming material through said second vertical chamber.

27. The apparatus set forth in claim 23 including a second melting vessel in which solid glass forming components are received, melted, and reacted with one another to produce molten glass or a molten glass precursor, wherein said second melting vessel is operatively coupled to said inlet of said first vertical chamber such that the molten glass or the molten glass precursor produced in said second melting vessel is introduced into said first vertical chamber via said inlet of said first vertical chamber.

28. A modular apparatus for making glass, including at least two apparatuses as set forth in claim 23, said apparatuses being arranged in parallel and being selectively connectible and disconnectable from one another.

29. The apparatus set forth in claim 23 wherein said cross passage includes a first end, a second end opposite said first end, and an outlet located at an intermediate location between said first and second ends, said upper end of said first vertical chamber being connected to said first end of said cross passage, said upper end of said third vertical chamber being connected to said second end of said cross passage, and said inlet of said second vertical chamber being operatively coupled to said outlet of said cross passage.

30. An apparatus for making silica-based glass including:
a first vertical chamber having an inlet adjacent a lower end thereof through which molten glass is received;
a second vertical chamber spaced from and separate from said first vertical chamber;
a third vertical chamber spaced from and separate from said first vertical chamber and said second vertical chamber and having an inlet adjacent a lower end thereof through which molten glass is received;
a cross passage connecting upper ends of said first, second, and third vertical chambers, said cross passage having a first inlet through which at least one solid glass-forming material is received and introduced into molten glass flowing through said cross passage; and
a cullet melting vessel that receives and melts solid cullet to produce molten glass;

wherein said second vertical chamber has an inlet at its upper end through which molten glass is received from said first and third vertical chambers and an outlet at a lower end thereof through which molten glass is discharged, and wherein said third vertical chamber has an inlet adjacent a lower end thereof and said cullet melting vessel is operatively coupled to said inlet of said third vertical chamber such that molten glass produced in said cullet melting vessel flows upward through said third vertical chamber and into said cross passage.

\* \* \* \* \*